S. GIBSON.
CARRIAGE RUNNING-GEAR.
No. 193,444. Patented July 24, 1877.
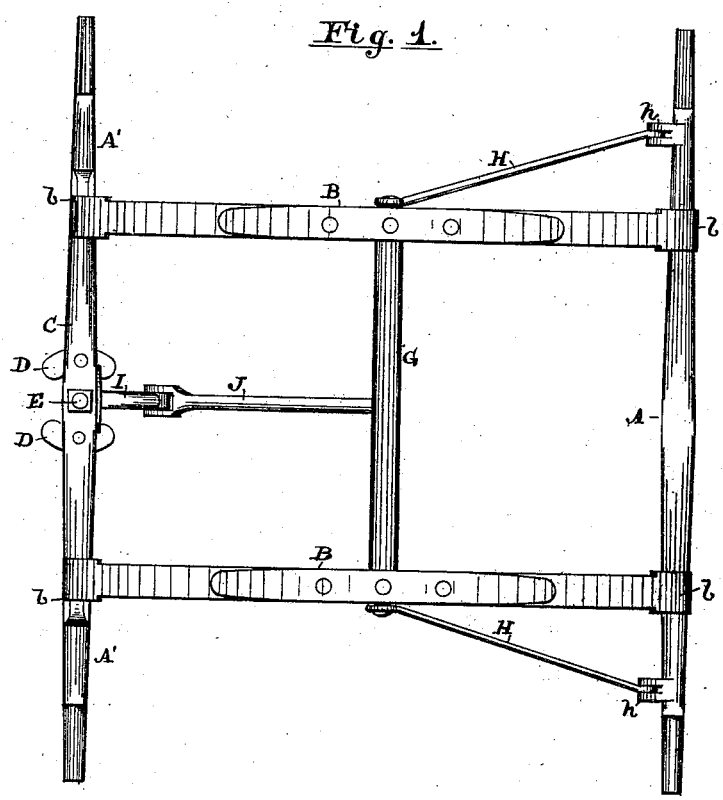
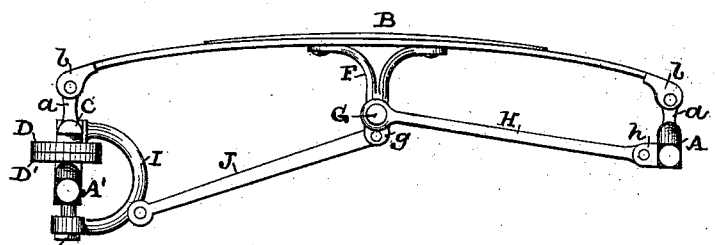
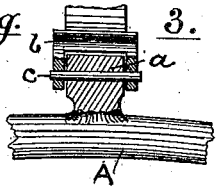

UNITED STATES PATENT OFFICE.

SIDNEY GIBSON, OF SHARON, PA., ASSIGNOR OF ONE-HALF OF HIS RIGHT TO CORNELIUS BOWDEN AND WILLIAM KNIGHTON, OF SAME PLACE.

IMPROVEMENT IN CARRIAGE RUNNING-GEAR.

Specification forming part of Letters Patent No. 193,444, dated July 24, 1877; application filed May 31, 1877.

*To all whom it may concern:*

Be it known that I, SIDNEY GIBSON, of Sharon, in the county of Mercer and State of Pennsylvania, have invented certain new and useful Improvements in Carriage Running-Gear; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to the construction of the running-gear of carriages, road-wagons, buggies, &c.; and the invention consists in certain new coupling attachments and braces, by means of which the springs are connected together, and with the axle and head-block, the whole forming a very strong running-gear, without material addition to its weight.

The parts are all connected or shackled together, so that any unusual strain upon one part is distributed over the whole—one part coming to the relief of the other; and the connections not being rigid, permit, or do not interfere with, the necessary yielding movement of the spring.

In the accompanying drawings, Figure 1 is a plan view of a running-gear embodying my improvements. Fig. 2 is a side view or elevation of the same; Fig. 3, a detail view, partly in section.

Referring to the parts by letters, A A' represent the axles, and B B the springs. C is the head-block or cross-bar with which the forward ends of the springs are connected, the other ends of the springs being connected with the rear axle A. *b* represents eyes on the ends of the springs, which fit over studs or projections *a* formed on the upper sides of the rear axle and head-block C. Bolts *c* are then passed through the eyes *b* and studs *a*, as clearly shown by Fig. 3 of the drawings, the whole forming a strong and effective coupling, which does not weaken the strength of the parts, no bolt-holes being formed in the body of either the axle, spring, or head-block, for the purpose of coupling them together. D D' represent the fifth wheel, and E the king-bolt. F represents forked or Y-shaped brackets, which are secured, one to each spring, at or about the middle. G is a shackle or brace-bar, the ends of which pass through the brackets F and through the forward ends of the brace-rods or shackles H H, the rear ends of which are pivoted between forked lugs or projections *h h* on the rear axle A. I is a bracket, the upper end of which is riveted or otherwise secured to the head-block C, and its lower end is formed with an eye, through which the king-bolt passes, said king-bolt also passing through a sleeve on the axle A'. J is a shackle or brace bar, the forward end of which is forked, so as to fit over a corresponding projection on the bracket I, and to which it is coupled by means of a bolt passing through them. The rear end of the brace J is similarly coupled between the forks of a projection, *g*, formed at the middle and on the under side of the cross-brace G.

Thus constructed, it will be seen that all the parts of the running-gear are connected or shackled together so as to brace each other, without interfering with the motion of the springs, and the consequent play or limited movement of the other parts with which the springs are connected.

Having thus described my invention, what I claim as new, and desire to secure by Letters Patent, is—

The herein-described running-gear, consisting of the axles A A', head-block C, springs B B, brackets F and I, and connecting-shackles or braces G, H, H, and J, constructed and operating substantially as and for the purpose specified.

In testimony that I claim the foregoing as my own, I affix my signature in presence of two witnesses.

SIDNEY GIBSON.

Witnesses:
FREDERICK FENTON,
CORNELIUS BOWDEN.